2 Sheets—Sheet 1.
J. PHILLIPS.
HOG-TRAP.
No. 175,152.
Patented March 21, 1876.
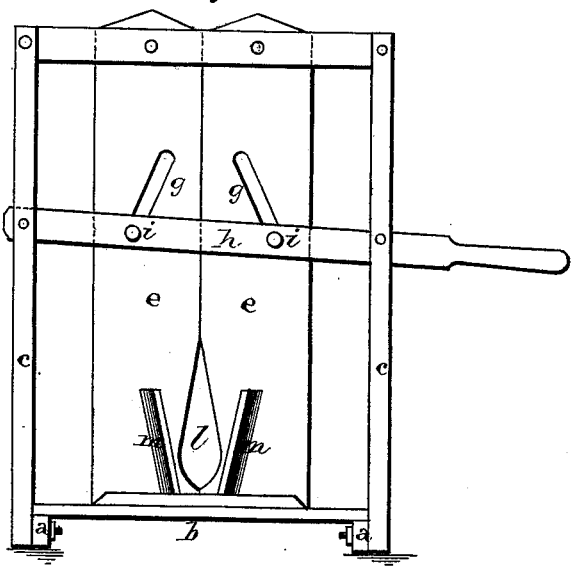
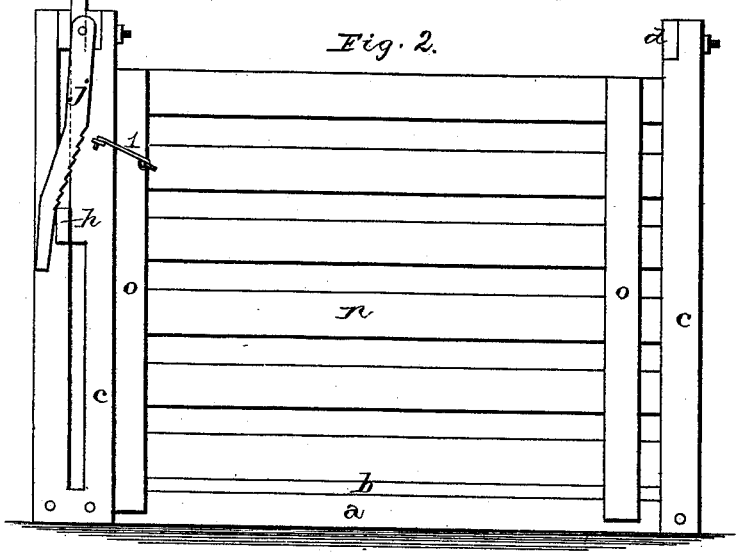
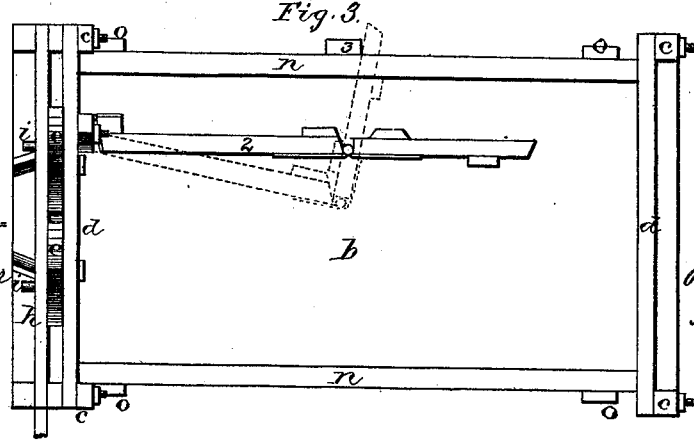
WITNESSES.
Wm Garner
F. N. Burnham.
INVENTOR:
Jos. Phillips
per
F. A. Lehmann
Atty
N. PETERS, PHOTO-LITHOGRAPHER, WASHINGTON, D. C.

J. PHILLIPS.
HOG-TRAP.
No. 175,152. Patented March 21, 1876.
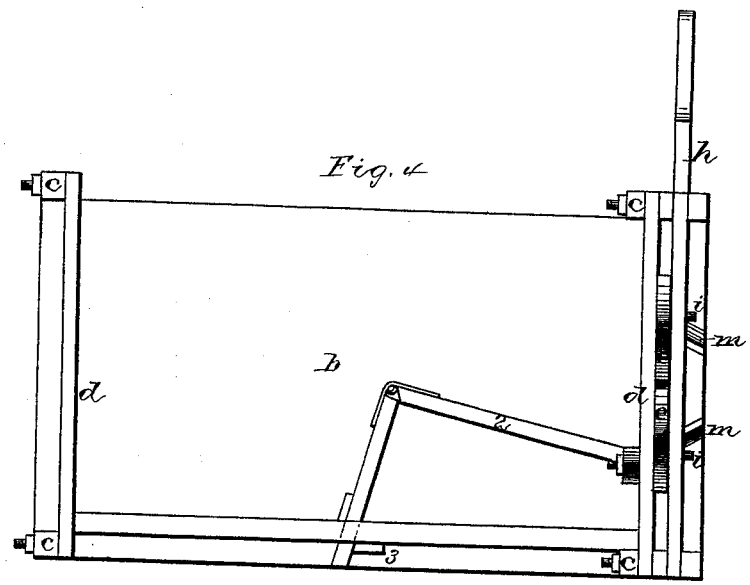
WITNESSES.
J. Wm. Garner,
F. M. Burnham.
INVENTOR.
Jos. Phillips,
per
F. A. Lehmann, Atty

UNITED STATES PATENT OFFICE.

JOSEPH PHILLIPS, OF ELKHART, ILLINOIS.

IMPROVEMENT IN HOG-TRAPS.

Specification forming part of Letters Patent No. 175,152, dated March 21, 1876; application filed February 10, 1876.

*To all whom it may concern:*

Be it known that I, JOSEPH PHILLIPS, of Elkhart, in the county of Logan and State of Illinois, have invented certain new and useful Improvements in Hog-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in hog-traps; and it consists in the arrangement and combination of devices that will be more fully described hereinafter.

The accompanying drawings represent my invention.

$a$ represents two ground-sills, which are covered and connected together by the flooring $b$. From the ends of these sills rise the four standards $c$, each pair of which are braced together at their upper ends by the cross-bars $d$. At one end there are two of these bars, slightly separated, and between them are pivoted the two jaws $e$, each of which has a diagonal slot, $g$, cut through it, and a recess formed in its lower inside edge, in which the hog is caught and held. Pivoted in a slot in one of the standards $c$ is the operating-lever $h$, which extends across the end of the frame and projects through a slot in the other standard. Projecting from the side of this lever are two pins, $i$, which enter the two diagonal slots $g$ in the jaws, and as the free end of the lever is raised or lowered these pins cause the jaws to open or close to any desired degree. Pivoted to the side of the frame is the ratchet-bar $j$, which serves as a stop to hold the end of the lever down and prevent the jaws from opening after a hog has been caught. This lever can be pivoted to either one of the end standards, and made to operate from either side desired. To each of the jaws $e$, just outside of the notches $l$, in which the animal is held, is secured a short board, $m$, the outer ends and lower edges of which are nearer together than the other two ends or edges.

These boards come immediately alongside of the animal's head or body as it is held between the jaws, so as to prevent it from struggling too much while being castrated, spayed, or marked. The opposite end of the trap from the jaws is left open, but the two sides are closed by the removable side frames $n$, which are held in position by the extensions on the ends of the uprights $o$ and hooks 1, but which frames can be removed at pleasure. Inside of the trap is secured a vertical standard, to which is hinged the table 2. This table is made in two sections, that are hinged together so that it can be opened out into one straight piece and closed back against the side of the frame when not needed. The two sections can be turned at right angles to each other when it is desired to form a table. To use the table the side frame $n$, on the opposite side, is removed, the trap is turned over on its side, and the table is then bent, as shown, until its ends abut against the vertical bar 3 that is fastened to the side frame.

This trap can be used for spaying, marking, castrating, ringing, and dressing hogs; is cheap and simple in its construction, and is strong and durable.

By having both jaws slotted and made to move they are made to operate twice as quickly and to hold the animal more securely.

Having thus described my invention, I claim—

1. The jaw $e$, having notch $l$, and boards $m$ on each side of the notch, substantially as described.

2. A hog-trap, composed of the frame $a\ b\ c\ n$, jaws $e$, having the pieces $m$ and slots $g$, in combination with the levers $h$ and jointed table 2, substantially as shown and described.

In testimony that I claim the foregoing, I have hereunto set my hand this 27th day of January, 1876.

JOSEPH PHILLIPS.

Witnesses:
ANDREW HURST,
ANTHONY E. RIDGEWAY.